Sept. 5, 1933.  L. A. PARADISE  1,925,275
CORN HARVESTER
Filed Nov. 8, 1929  2 Sheets-Sheet 1
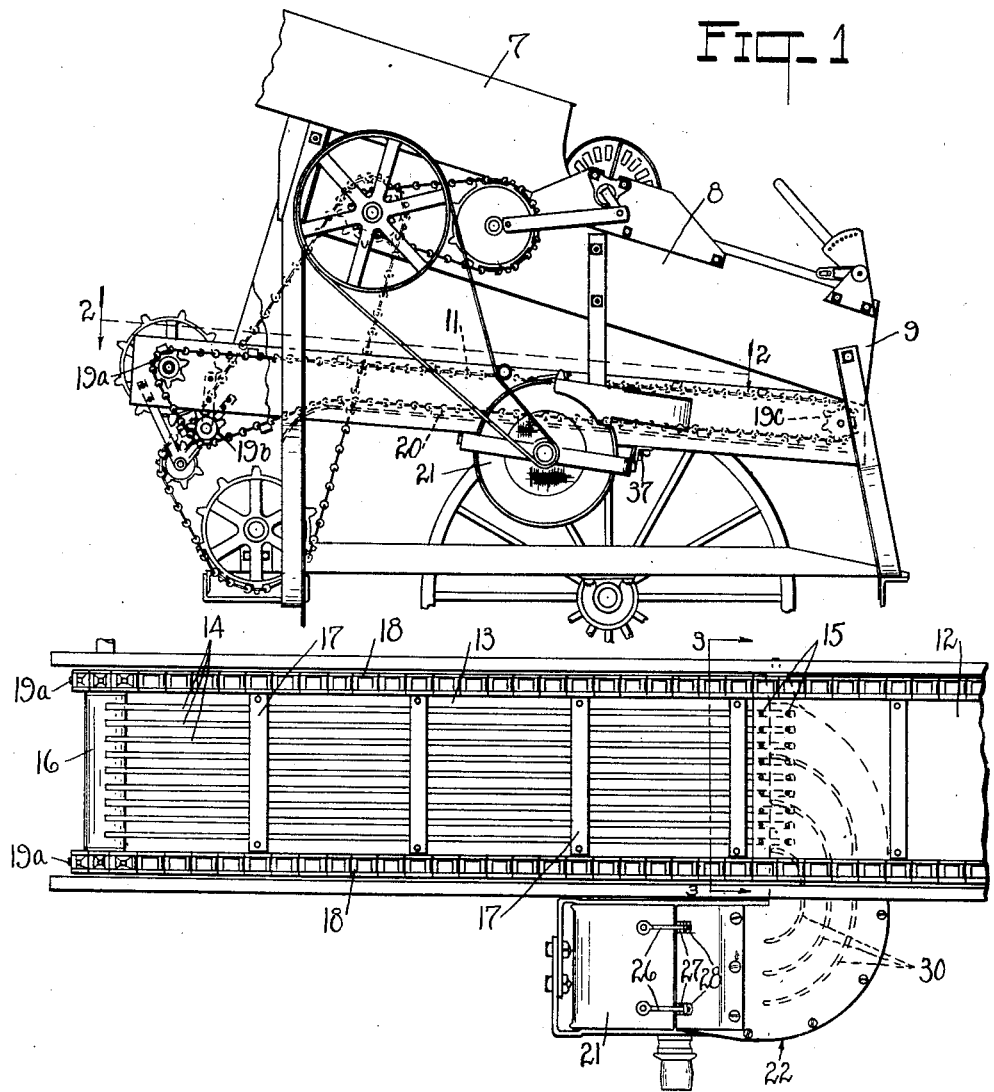
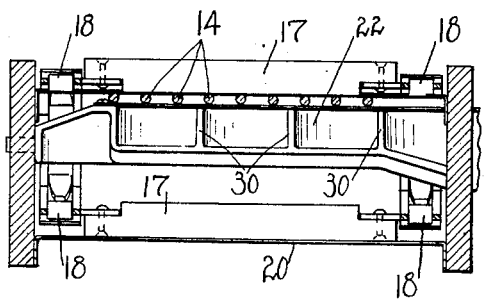
INVENTOR
Louis A. Paradise,
BY Brown, Jackson, Boettcher & Dienner
ATTYS.
WITNESS
A. D. McLeay

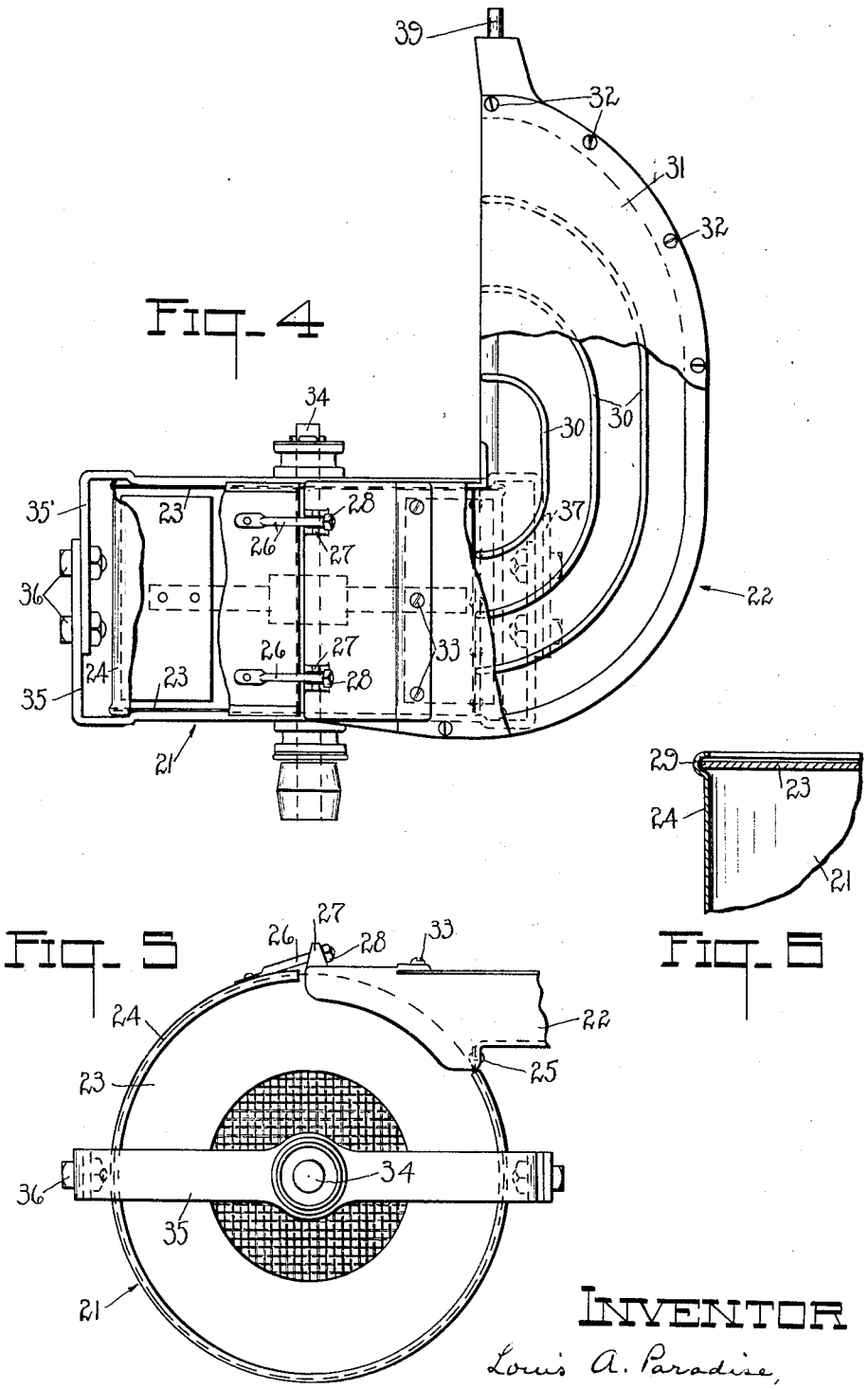

Patented Sept. 5, 1933

1,925,275

UNITED STATES PATENT OFFICE 1,925,275

CORN HARVESTER

Louis A. Paradise, Moline, Ill., assignor to Deere & Company, Moline, Ill., a corporation of Illinois Application November 8, 1929. Serial No. 405,600

10 Claims. (Cl. 130—5)

The present invention relates generally to corn husking mechanism, and more particularly to husking mechanism such as is employed in harvesting machines which snap the ears from the standing stalks and husk these ears as a continuous operation while the machine is traveling in the field.

The invention has certain features cooperating with this type of machine but it will be understood that the invention is not limited to this specific use.

It is one of the particular objects of the invention to provide improved mechanism for separating from the husks any kernels of corn which may have been broken off the ears in the husking operation. The improvements residing in this separating mechanism have to do primarily with preventing such mechanism from becoming clogged by the husks.

Another feature of the invention is the location of the fan blower. Heretofore it has been customary to locate the fan blower below the husk expelling mechanism but this location of the blower has been found objectionable inasmuch as rain and dirt falling into the blower from above tend to quickly clog up the fan. To overcome this difficulty, the blower has been constructed with a protecting enclosure therefor, coacting with a U-shaped duct of unique construction which permits the blower to be located to one side of the husk expelling mechanism, thereby overcoming the former difficulty of clogging.

Another object of the invention is to provide an improved construction of a fan blower, which co-operates with the mechanism used to expel the husks and foreign matter.

Other features pertaining to the present invention will be pointed out in the following specification.

The preferred construction in which these improvements reside will now be described in connection with the accompanying drawings, wherein:

Fig. 1 is a fragmentary side view of a corn harvester;

Fig. 2 is a sectional view taken along the line 2—2 of Fig. 1, showing the relation of the fan blower to the husk expelling mechanism;

Fig. 3 is a cross sectional view taken along the line 3—3 of Fig. 2;

Fig. 4 is an enlarged plan view of the fan blower and its sectionalized air duct, with the covers of the blower and duct partly broken away;

Fig. 5 is a side elevational view of the fan blower; and

Fig. 6 is a fragmentary sectional view of the fan blower casing showing the construction thereof.

Referring to Fig. 1, a conveyor 7 is adapted to receive ears of corn after they are picked for conveying the ears to the husking rollers located in the chamber 8. The husked ears of corn are discharged from the chamber 8 at 9 on to an elevator (not shown), by which they are conveyed to the point of loading which is usually a wagon traveling alongside the corn picker. As the ears of corn pass along the husking rollers in chamber 8 the husks fall through the bottom of the chamber 8 on to the table 11, which comprises the separating means for separating any loose corn kernels from the husks and also includes the husk discharging means. The table 11 as best shown in Fig. 2, has a closed portion 12 and a slatted portion 13 forming a separating grating. The slatted portion 13 is composed of a series of rods 14 of circular cross section, which are secured at their right hand ends to the closed portion of the table at 15 and the left hand ends of which are free and rest upon a wooden roller 16 located at the delivery end of the husk expelling mechanism. This latter mechanism comprises a series of transverse slats 17 carried by side chains 18 providing a means for conveying the husks and other foreign matter along the rods 14. These chains and slats travel over sprocket wheels 19a, 19b and 19c arranged substantially as shown in Fig. 1, and may be driven in any suitable manner. Located below the table 11 is a second closed in table 20 which is adapted to catch the corn kernels which have been broken off during the husking process, and which have dropped out of the chamber 8 with the husks and then through the rods 14 which separate the husks therefrom. In Figs. 1 and 3 the chains 18 are shown carrying the slats 17 back over the top side of the lower closed in table 20 for conveying these kernels of corn to the forward end of the machine so as to drop them upon the same elevator into which the husked corn is dropped. In this manner practically all the kernels which may have been broken from the ears in the husking operation are reclaimed or saved.

In order to aid in moving the husks and foreign matter to the rear of the machine along the grating consisting of the rods 14, a fan blower 21 is utilized. This blower 21 is supported by the frame structure of the separating mechanism and is situated at one side thereof, and a sectionalized air duct 22 directs the air discharged from the blower to a point beneath the grating of table 11. In this manner the blast of air from the blower will be sent up through the rods 14 impinging on the husks and foreign matter that is being carried by the rods and in so doing aids in moving this matter and in separating the kernels therefrom while it is being conveyed to the rear of the machine by means of the transverse slats 17.

The preferred construction of the fan blower 21 and the sectionalized discharge duct 22 is clearly illustrated in Figures 4, 5 and 6. The blower 21 comprises two circular side plates 23 which are spaced apart and held secure by means of the rim 24. One end of the rim 24 is riveted to the lower edge of the duct 22 at 25. The other end of the rim 24 is held by the bolts 26 riveted thereto, which engage forked lugs 27 mounted on the top side of the discharge duct 22, and a pair of nuts 28 are utilized to hold the bolts and to draw the rim 24 up under tension upon the side plates 23. The manner in which the side plates 23 are spaced apart and held securely by the rim 24 is best shown in Fig. 6. The rim 24 is formed with a bead 29 at each edge which is adapted to receive the edge of the adjacent side plate 23. With this construction it is a simple matter to clean the blower mechanism as it requires only the removal of the nuts 28 to gain access thereto.

The blower discharge duct 22 comprises a casting which is divided into a number of sections by means of a series of upstanding flanges or baffle walls 30, in order to more evenly distribute the air over the entire width of the grating of table 11. The upstanding flanges or baffle walls 30 also serve to strengthen and stiffen the casting. A removable cover 31 encloses the top side of the duct 22 and it is held in place by means of the screws 32 and 33. This cover 31 may be easily removed whenever the duct 22 may require cleaning.

The rotor shaft 34 of the blower is supported in bearings carried by two U-shaped brackets 35, 35' which are clamped or bolted together at 36. These brackets are secured to the table 20 by means of the supports 37, as best shown in Fig. 1.

The discharge duct 22 is supported near one end in an opening in the outer side wall of the separating mechanism, and connects with the blower at this end, the other end of the duct having a supporting stud 39 which engages in an opening in the inner side walls of the separating mechanism. In this manner the discharge duct 22 is rigidly supported by the separating mechanism, and by reason of such support, the duct aids in supporting the blower.

The present arrangement of the husk expelling mechanism and the fan blower associated therewith has proved to be a very efficient construction for separating the loose kernels from the husks and for discharging the husks from the machine. Of particular importance in this regard is the circular sectional formation of the rods 14 and their free mounting on the roller 16. By virtue of the rounded surfaces, the inner side of each rod presents less surface area in proximity to the next adjacent rod, and hence there is less tendency for the husks becoming clogged or lodged between the rods.

Furthermore, all cross-braces of any kind between these rods have been omitted to further prevent clogging, the omission of the cross-braces being permitted in view of the fact that the free ends of the rods 14 receive their support by means of the roller 16. The ability of the roller 16 to revolve and the fact that it is driven from the end sprocket wheels 19a over which the conveyor chains 18 travel, assists materially in preventing the husks from clogging between the rods 14 and roller 16 as the husks are brought up to these ends of the rods.

Although I have illustrated and described a preferred form of the embodiment of my invention, I do not wish to be limited directly to such a disclosure, but only in so far as the appended claims are limited thereto.

I claim:

1. The combination with separating mechanism comprising a slatted table and a solid table spaced below the slatted table, an endless conveyor having one run passing over the slatted table and its return run passing over the solid table, and side walls enclosing the separating mechanism, of a blower having a discharge duct extending through an opening in one of the side walls between the two runs of the conveyor, said duct having an opening directing a blast of air from the blower longitudinally with respect to the conveyor.

2. The combination with separating mechanism comprising a slatted table and a solid table spaced below the slatted table, an endless conveyor having one run passing over the slatted table and its return run passing over the solid table, and side walls enclosing the separating mechanism, of a blower having a discharge duct extending through an opening in one side wall, and supported from the other side wall, said duct having an opening directing a blast of air from the blower longitudinally with respect to the conveyor.

3. The combination with separating mechanism comprising a slatted table and a solid table spaced below the slatted table, an endless conveyor having one run passing over the slatted table and its return run passing over the solid table, and side walls enclosing the separating mechanism, of a blower having a discharge duct extending through an opening in one side wall, and having a projecting lug extending into a correspondingly shaped opening in the other side wall, said duct having a discharge opening directing a blast of air from the blower longitudinally with respect to the conveyor.

4. The combination with a corn harvester having husking rollers associated therewith, and a husk expelling mechanism comprising a slatted table, a solid table spaced below the slatted table, and a conveyor chain having one run thereof passing over the slatted table and the other run thereof passing over the solid table, of means disposed laterally of and adjacent to the husk expelling mechanism for introducing a blast of air into said mechanism between the two runs of said chain, said means being adapted to direct the air in a horizontal stream to aid in conveying the husks and other foreign matter.

5. The combination with a corn harvester having husking rollers associated therewith and a husk expelling mechanism comprising a slatted table, a solid table spaced below the slatted table, and a conveyor chain having one run thereof passing over the slatted table and the other run thereof passing over the solid table, of a blower disposed laterally of and adjacent to said husk expelling mechanism, and a duct adapted to discharge the air from said blower horizontally into the husk expelling mechanism between the top and bottom runs of the chain to aid in conveying the husks and other foreign matter.

6. The combination with a corn harvester having husking rollers associated therewith and a husk expelling mechanism comprising a slatted table, a solid table spaced below the slatted table, and a conveyor chain having one run thereof passing over the slatted table and the other run thereof passing over the solid table, of a blower disposed laterally of and adjacent to said husk expelling mechanism, and a duct communicating with the husk expelling mechanism in a horizontal plane, and having an opening disposed between the top and bottom runs of the chain and adapted to discard the air from the blower horizontally into the husk expelling mechanism between said top and bottom runs of said chain to aid in conveying the husks and other foreign matter.

7. The combination with a corn harvester having husking mechanism associated therewith, of husk expelling mechanism including a table having a separator comprising a plurality of substantially flexible members disposed in spaced relation to each other, each of said members having one end fixedly secured to one end of said table and extending independently therefrom, a smooth surfaced support at the other end of said table, said members each having their free ends loosely resting upon said support for lateral shifting movement relative thereto, and conveyor means for moving husks and other foreign material along the aforesaid members.

8. The combination with a corn harvester having husking mechanism associated therewith, of husk expelling mechanism including a table having a separator comprising a plurality of substantially flexible members disposed in spaced relation to each other, each of said members having one end fixedly secured to one end of said table and extending independently therefrom, a smooth surfaced roller at the other end of said table, said members each having their free ends loosely resting upon said rollers for lateral shifting movement relative thereto, and conveyor means for moving husks and other foreign material along the aforesaid members, said roller being operated simultaneously with the operation of said conveyor means.

9. The combination with a corn harvester having husking mechanism associated therewith, of husk expelling mechanism including a table having a separator comprising a plurality of substantially flexible members disposed in spaced relation to each other, each of said members having one end fixedly secured to one end of said table and extending independently therefrom, a smooth surfaced roller at the other end of said table, each of said members having its free end loosely resting upon said roller for lateral shifting movement relative thereto, and conveyor means for moving husks and other foreign material along the aforesaid members and comprising a pair of chains and transverse slats carried thereby and adapted to pass along the top of the flexible members, said roller being operated simultaneously with the operation of said conveyor means.

10. The combination with a corn harvester having husking mechanism associated therewith, of husk expelling mechanism including a table having a separator comprising a plurality of substantially flexible members disposed in spaced relation to each other, each of said members having one end fixedly secured to one end of said table and extending independently therefrom, a smooth surfaced roller at the other end of said table, said members each having their free ends loosely resting upon said roller for lateral shifting movement relative thereto, and conveyor means for moving husks and other foreign material along the aforesaid members and comprising a pair of chains carrying transverse slats passing along the top of the flexible members, said roller being operated simultaneously with the operation of said conveyor means and said flexible members terminating substantially at the point of tangency with the roller whereby said roller continuously wipes the under-side of the free ends of the members while the top side of the free ends of the members are continuously wiped by the slats passing over the ends of said members.

LOUIS A. PARADISE.